(12) United States Patent
Even, Jr.

(10) Patent No.: US 6,348,431 B1
(45) Date of Patent: Feb. 19, 2002

(54) METHOD FOR LOW TEMPERATURE PREPARATION OF A NOBLE METAL ALLOY

(75) Inventor: William R. Even, Jr., Livermore, CA (US)

(73) Assignee: Sandia National Laboratories, Livermore, CA (US)

( * ) Notice: Subject to any disclaimer, the term of this patent is extended or adjusted under 35 U.S.C. 154(b) by 0 days.

(21) Appl. No.: 09/294,269

(22) Filed: Apr. 19, 1999

(51) Int. Cl.[7] .......................... B01J 23/00; B01J 23/40; B01J 23/70; B01J 23/74
(52) U.S. Cl. ...................... 502/325; 502/326; 502/337; 502/338; 502/339
(58) Field of Search ................................ 502/325, 326, 502/337, 338, 339

(56) References Cited

U.S. PATENT DOCUMENTS

| | | | | |
|---|---|---|---|---|
| 3,357,819 A | | 12/1967 | Landsberg ..................... 75/0.5 |
| 4,048,096 A | * | 9/1977 | Bissot ......................... 252/430 |
| 4,136,059 A | | 1/1979 | Jalan et al. .................. 252/447 |
| 4,145,214 A | | 3/1979 | Yoerger ........................ 430/71 |
| 4,440,670 A | | 4/1984 | Horowitz et al. ........... 423/629 |
| 4,721,524 A | | 1/1988 | Sheldon et al. ............. 75/0.5 A |
| 5,130,172 A | | 7/1992 | Hicks et al. ................. 427/252 |
| 5,435,985 A | * | 7/1995 | Pukkinen et al. ........... 502/303 |
| 5,514,202 A | | 5/1996 | Lin et al. ...................... 75/351 |
| 5,641,723 A | * | 6/1997 | Bonnemann et al. ....... 502/326 |
| 5,686,150 A | | 11/1997 | Matsumoto ................. 427/558 |

OTHER PUBLICATIONS

Kim, Y.S., Monforte, F.R., "Theoretically Dense (99.9%) Polycrystalline Alumina Prepared from Cryochemically Processed Powders," American Ceramic Society Bulletin, vol. 50, No. 6 Jun. 1971, pp. 532–535.

Mirkovich, V.V., Wheat, T.A., "Use of Liquid Nitrogen In Spray Freezing," American Ceramic Society Bulletin, vol. 49, No. 8 Aug. 1970, pp. 724–725.

Kelly, J., Hibbert, D.B., Tseung, A.C.C., "A critical examination of a cryochemical method for the preparation of high surface area semiconducting powders," J. Mat. Sci., vol. 13, 1978 pp. 1053–1060.

* cited by examiner

Primary Examiner—Mark L. Bell
Assistant Examiner—J. Pasterczyk
(74) Attorney, Agent, or Firm—T. P. Evans (57) ABSTRACT

A method for producing fine, essentially contamination free, noble metal alloys is disclosed. The alloys comprise particles in a size range of 5 to 500 nm. The method comprises 1. A method for preparing a noble metal alloy at low temperature, the method comprising the steps of forming solution of organometallic compounds by dissolving the compounds into a quantity of a compatible solvent medium capable of solvating the organometallic, mixing a portion of each solution to provide a desired molarity ratio of ions in the mixed solution, adding a support material, rapidly quenching droplets of the mixed solution to initiate a solute-solvent phase separation as the solvent freezes, removing said liquid cryogen, collecting and freezing drying the frozen droplets to produce a dry powder, and finally reducing the powder to a metal by flowing dry hydrogen over the powder while warming the powder to a temperature of about 150° C.

7 Claims, 8 Drawing Sheets

METHOD FOR LOW TEMPERATURE PREPARATION OF A NOBLE METAL ALLOY

STATEMENT OF GOVERNMENT INTEREST

This invention was made with Government support under contract no. DE-AC04-94AL85000 awarded by the U. S. Department of Energy to Sandia Corporation.

The Government has certain rights in the invention.

BACKGROUND OF THE INVENTION

1. Field of the Invention

This invention relates generally to the preparation of submicron-sized noble metal alloy particles. More particularly, the present invention relates to a method for forming fine powdered alloys of platinum and rhodium with a discrete size and shape. The method comprises: 1) forming a dilute solution of soluble metal salts to form soluble solute aggregates consisting of a joint metal salt species, 2) fast freezing droplets of the dilute solution in a liquid cryogen in order to separate the solution droplets into solute-rich and solvent-rich phases, 3) subliming of the frozen droplets to remove the frozen solvent from both phases to provide a joint metal salt powder, and, 4) reducing the powder to provide a joint metal species.

Applications for which the present invention may be useful include the formation of catalysts such as those used in electrochemical applications, including fuel cells and the like, automotive applications such as automotive catalytic converters, and other similar applications. Also useful are application wherein the metal particles are used to form inks which may be laid down and subsequently processed to form electrically conductive pathways such as on ceramic integrated circuit (IC) chip carriers. Finally, these materials may be used as the feedstock for forming near net shaped parts using electrochemical or laser assisted deposition and/or consolidation techniques.

The instant application, therefore, is drawn to the chemical arts, in general, and the catalysis arts and nano-particle arts, in particular. Accordingly, it is appropriate to search these fields for art which might prove to be of significance in determining the relevance and uniqueness of the approach taken by the instant invention.

Regarding the catalyst arts, the instant invention is particularly drawn to methods for forming small particles, either as a pure powder which is later dispersed onto a support means or as particles suspended directly onto the support means. Commonly known methods for loading catalysts particles onto catalyst support means include precipitation, adsorption, ion exchange, and impregnation. Precipitation is typically carried out such that a support means, comprising powders or particles, is mixed into a metal salt solution at a concentration sufficient to obtain the required loading of the catalyst onto the support; for example, as a metal hydroxide or carbonate, and to cause interaction of the precipitate with the support surface. Numerous steps may be required to control the size of the precipitated particles and the amount of precipitate loaded onto the support. Preparation of alloyed particles is particularly problematic.

Adsorption is carried out by exposing support to salt solutions wherein the support typically adsorbs some quantity of the salt ions. Adsorption of salt ions from solution may be either cationic or anionic depending on the properties of the support surface.

The ion exchange process for loading a metal catalyst onto a support is similar to the adsorption process. For example, ion exchange support means have been developed whereby the ion exchange material is prepared with a specific concentration of one species, such as sodium, which is washed with a solution of a second species, such as ammonium, resulting in $NH^{+4}$ ions being exchanged for $Na^+$ ions. The treated ion exchange support means can be soaked in a solution containing the metal catalyst, and the metal catalyst may then be loaded onto the ion exchange support means. The extent of metal catalyst loading depends on, among other things, the soaking time and the concentration of sodium on the ion exchange material.

In impregnation processing, metal salt solutions are typically incorporated into pores which are present in support means. The support means can be heated or evacuated to remove moisture in the pores and to accelerate the rate of diffusion of the salt into the pores. Drying is typically required to crystallize the salt on the surface, and may result in irregular concentrations or distributions of the metal salt. Non-uniformity of particle concentration and distribution typically results.

In preparing catalysts by the techniques discussed above, after the metal salt is deposited onto a support means, the metal salt typically is reduced to an active phase, such as an active phase comprising an oxide or a pure metal. Thermal decomposition procedures are frequently used and typically occur in a reducing atmosphere, such as hydrogen gas. Thermal decomposition procedures may be beneficial only when used in combination with support means which can withstand the temperatures associated with the thermal decomposition process (for example, the support means should not be adversely modified by such thermal decomposition processes). Examples of high temperature materials suitable as support means includes carbon and various ceramic materials. Thus, the effectiveness of the purely thermal decomposition technique is limited to supports or substrates which can withstand the temperatures associated with thermal decomposition. Thermal decomposition processes may be further limiting where the metal catalysts themselves can be adversely affected by high temperatures. Furthermore, the exceedingly high temperatures required for alloying "refractory" metals typically lead to further difficulties regarding contamination of the alloy by the containing vessel, etc.

Alternative techniques for decomposing a metal salt into an active phase include direct chemical reducing techniques. Reducing techniques may comprise reducing agents such as, hydrazine or sodium tetrahydroborate and the like, which may be used to reduce the metal salt to a metal catalyst.

In the formation of nano-particles, the instant invention is drawn to a unique method for forming alloys. In particular, synthesis of the particles from "first principles," i.e., assembling atoms into clusters, is most easily accomplished with single phase systems and becomes much more difficult as the system becomes more complex. Specifically, creating alloy particles of refractory metals without the prerequisite high temperature remains a non-trivial hurdle. One of the difficulties comprises maintaining the proper composition throughout the synthesis to avoid producing particles with varying composition. Another is the preparation of materials which are not contaminated by either their surroundings or the process used to achieve synthesized material, i.e., attrition (comminution) of melt produced alloys.

2. Description of Related Art

U.S. Pat. No. 5,686,150 discloses a process for depositing metals onto various substrates. In particular the patent teaches various salts of platinum, palladium and ruthenium deposited on substrates such as organic polymers, hybrid polymers and carbons. Said salts are then reduced by exposing the substrate with an energy source and then contacting the exposed substrate to a developer to permit reduction of the metal.

U.S. Pat. No. 5,514,202 discloses a method for producing fine alloy powders of silver and palladium at temperatures at or below 50° C. The method comprises forming solutions of the metal nitrates, mixing them, and then adding a neutralizing and complexing agent to the mixed solution to adjust the solution pH to between 2.5 and 3.5. This resultant solution comprises a silver and palladium ions. A solution comprising a reducing agent is then prepared and brought into contact with the mixed solution while stirring the solutions and maintaining the solution temperature between 15° C. and 50° C. in order to allow the silver and palladium ions to be reduced and to co-precipitate and form silver-palladium alloy particles.

U.S. Pat. No. 4,721,524 teaches a method for producing a non-pyrophoric submicron alloy powder of Group VIII metals. An aqueous chemical process involving spontaneous nucleation is employed in the manufacture of the alloy product. One such product is prepared with isomorphous compounds of nickel and palladium. In the preferred form, small concentrations of palladium and/or platinum ions are added to ionic nickel and/or cobalt solutions. A hot solution of the metal ions of nickel and/or cobalt and palladium and/or platinum is mixed with hydrazine in a hot basic aqueous solution and rapidly diluted with hot water. The precipitate formed is filtered, sequentially chemically washed, and dried. The dried alloy product is a black, non-pyrophoric, magnetic powder. Examination by electron probe and X-ray diffraction shows the alloy product to be a solid solution of the constituent metals.

U.S Pat. No. 4,145,214 discloses a photo-conductor composition that can be prepared by a co-crystallization technique. In particular, this invention teaches that the photoconductor can be formed by co-crystallization of the two components p-terphenyl and p-quaterphenyl, from solution in a common solvent. Typically the co-crystalline material is precipitated, for example, by subsequent evaporation of the solvent.

U.S. Pat. No. 3,357,819 discloses a process for preparing homogenous powders composed of ultra-fine particles. A solution or dispersion of a salt is freeze dried by dripping into a cold solution such as liquid nitrogen, followed by sublimation of the water from the particles. The patent does not refer to any pre-process method for controlling the shapes of the particles so generated.

Many other examples exist of alloy formation by similar solution-precipitation processes but, as will be shown, none exhibit the essential characteristics of the instant invention.

SUMMARY OF THE INVENTION

It has been discovered that certain organic compounds of platinum, and palladium can be dissolved into common organic solvents, caused to precipitate, and be reduced to the constituent metal at temperature below 200° C. to yield very small and essentially uncontaminated metal particles.

It also has been discovered that the presence of these materials in co-location with particles of other Group VIIIA noble metal will provide the same benefit; that the presence of platinum or palladium particles in close proximity to these other noble metal materials will aid in their low temperature reduction.

It also has been discovered that certain organic compounds of platinum and palladium, can be caused to co-crystallize with compounds of rhodium, iridium, rhenium, and ruthenium having the same organic ligand, and then reduced to a fine metal alloy at temperatures below 200° C.

The instant invention comprises a process which provides a pure noble metal alloy at temperatures below 150° C. The process yields high purity, small particles, typically in the submicron size range.

It is, therefore, an object of this invention to provide a process for preparing finely divided metal alloy at temperature near room temperature.

Another object of this invention is to provide a process for preparing finely divided, unagglomerated, alloy particles free of the contamination usually associated with solution or attrition processing powders.

Another object of this invention is to provide a process for preparing a noble metal alloy by dissolving an a metal-containing organic form of the desired product into a compatible solvent to induce formation of species complexes which can than be rapidly cooled in a cryogenic liquid nitrogen bath and thereby co-crystallizing the multiple solute complex species.

Yet another object of this invention is to provide a process for producing a metal powder which greatly reduces or eliminates post-process handling and thus greatly reducing the possibility of post-process contamination.

It is a further object of this invention to provide a low temperature process for making an electrode containing noble metal alloy particles uniformly dispersed on or throughout the electrode substrate.

Yet another object of this invention is to provide a low temperature method for producing a catalyst in situ, the catalyst comprising a porous support and a noble metal alloy uniformly dispersed throughout the support.

Another object of this invention is to provide free-flowing metal and metal alloy powders having a submicron particle size.

A final object of this invention is to provide a metal ink comprising submicron sized noble metal particles.

To achieve these and other objects, there is provided a method for producing noble metal and noble metal alloy powders at low temperature. It should be noted, however, that the instant invention is not limited solely to the a metal-containing organic compound disclosed herein but is applicable to any combination comprising platinum or platinum—like metals.

DETAILED DESCRIPTION OF THE PREFERRED EMBODIMENT

FIRST EMBODIMENT

Figure 1:
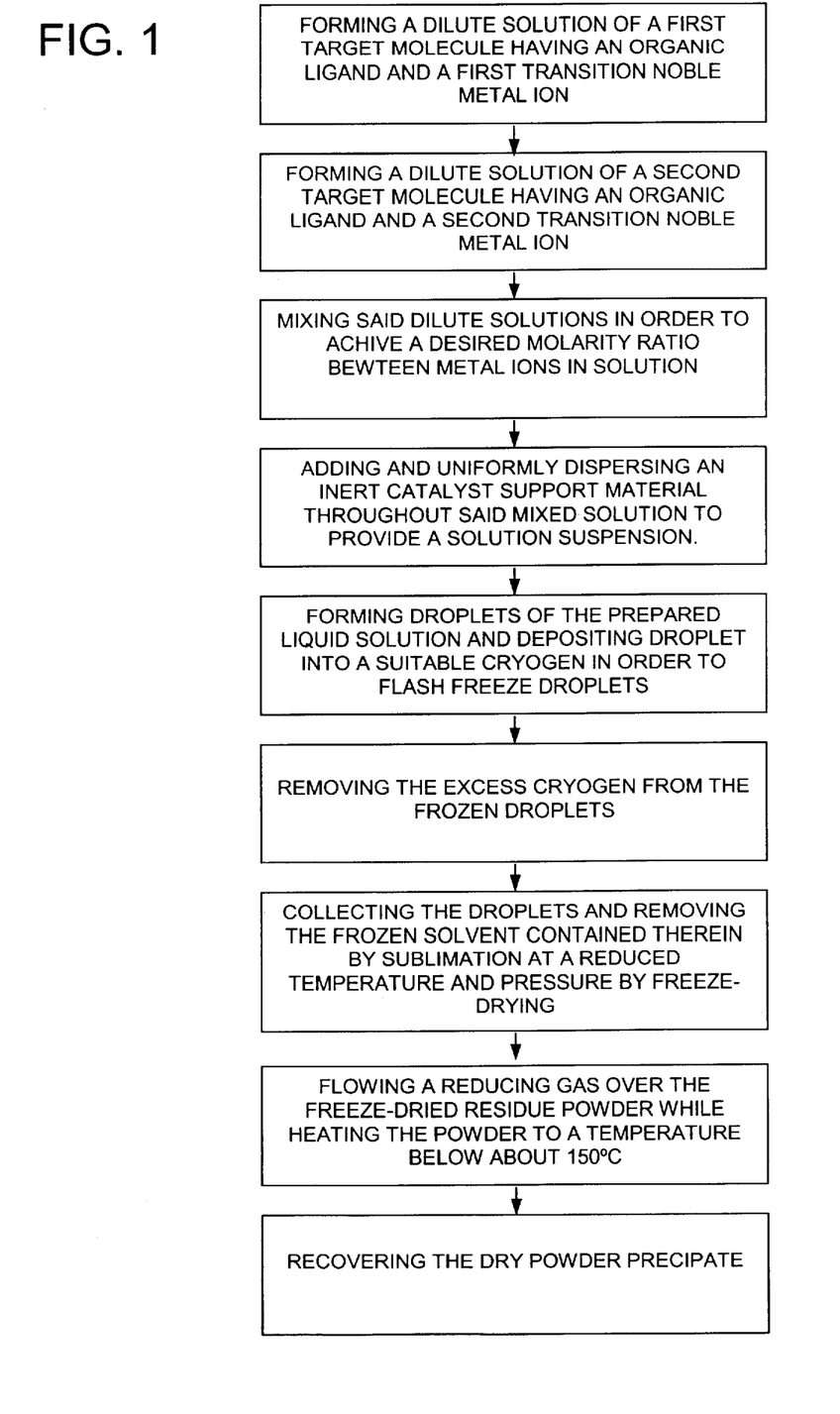
FIG. 1 schematically illustrates the disclosed process of the instant invention as a block flow diagram.

While the applicant does not wish to be tied to any particular theory as to the operability of the invention, it is believed the instant alloy is controlled by following the below described process. A schematic diagram of the instant process is shown in FIG. 1:

The present invention is drawn to a novel process for providing fine particles of a noble metal alloy. The general method comprises preparing solutions of metal-containing organic compounds in a suitably common solvent. These solution are then brought together and mixed thoroughly. Care needs to be exercised to avoid approaching solution saturation conditions and, in fact, moderate to low concentrations are preferred. The Applicant has discovered that the mixing of solutions of compounds of this type, in the instant solvent system, appears to produce solvation "complexing" which on rapid cooling leads to the formation of a single complex aggregate comprising both metal atoms. It is postulated that the solvent molecule plays a key role in this process—the solvent molecule accommodated within the crystal structure are large or bulky enough to accommodate solvated metal species having differing metal ion radii in a single "co-crystalline" complex molecule unit cell. (At this point, if direct preparation of the particles on a specific substrate or support is desired, the substrate powder is added to the solution and a suspension of the substrate and solution is maintained with suitable mixing.)

The mixed solution, or solution, is now introduced into a cryogenic bath by either dripping small amounts of the solution into the cryogen in order to quickly freeze each droplet or using a fine jet of the solution which is injected at such a velocity that it penetrates the cryogen surface and is dispersed within the bulk of the cryogen bath thereby producing a fine powder. This rapid freezing initiates an equally rapid solute/solvent phase separation which quenches the postulated metal-containing organic complex formed into very small co-crystalline clusters. After freezing, the droplets are collected and freeze-dried to remove the surrounding frozen solvent. Care must be taken at this stage to avoid allowing any of the droplets to begin to thaw.

Once the solvent sublimes, a collection of crystallites remains in the form of a fluffy powder of (mixed metal) ligand crystals. The final alloy product is formed by flowing hydrogen gas, typically 5% hydrogen/95% argon, over this powder for several hours while subjecting the powder to moderate heating.

In the preferred embodiment the disclosed method includes dissolving the acetylacetonate of platinum and that of another Group VIII noble metal, such as rhodium, palladium, or the Group VII metal rheniums, and ruthenium, into a suitable common organic solvent which is capable of accommodating the size differential between metal-ligand complexes by imposing a large enough unit cell on the crystallizing solute during co-crystallization. 1,2 dichloroethane is one such solvent. Others are possible. The key to the choice of solvent is to select one which will account for the size mismatch between the two species of metal-containing organic compounds during co-crystallization. The presence of the solvent molecule(s) in the crystal facilitates configuring the excess unit cell volume provided by the solvated molecule; i.e., selecting a solvent medium which imposes a structure on the co-crystalline unit cell such that the unit cell can accommodate metal species with different atomic radii.

The provided solutions are mixed, and then introduced, as droplets, into a cryogenic bath, such as liquid nitrogen. This bath quickly supercools each droplet and initiates a phase separation in the rapidly cooling liquid together with rapidly freezing the solvent medium. Final alloy concentration of the final alloy product is controlled by controlling the molar ratio of the respective metals in the mixed solution. Therefore, in order to form a 90% platinum, 10% rhodium alloy a mixed solution containing a 9:1 metal ion ratio is prepared.

The desired amount of the solution is thus treated, after which the cryogenic bath is allowed to evaporate or, it may be decanted. The frozen droplets are then collected while taking suitable precautions at this stage to assure that the droplets are never allowed to begin to thaw.

Figure 6:
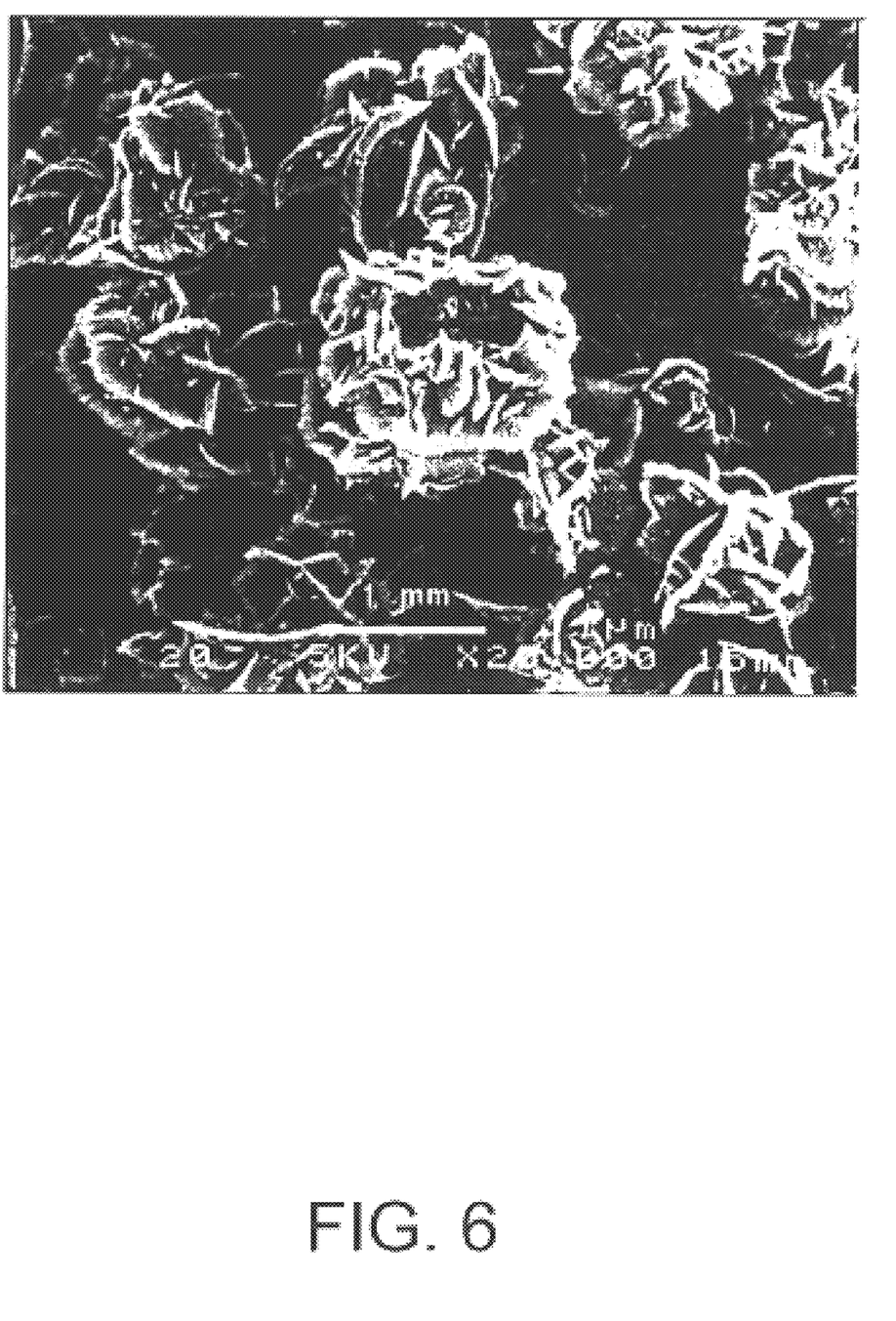
FIG. 6 shows a plurality of crystal rosettes of a Pt/Rh alloy.

The collected droplets are then freeze dried at a temperature where evaporative cooling maintains solidification until all of the solvent has been removed. This step requires about 24 to 48 hours depending upon vacuum pumping speed and the depth of the bed of drying powder. After removing the solvent, hydrogen gas or a hydrogen/argon mixture of gases is introduced and flowed over the powder at temperatures between about 50° C. and 150° C. for a period of time up to about 48 hours. A dry, free-flowing platinum alloy powder remains after the required heating step (FIG. 6 shows crystals of Pt/Rh). It is postulated that the presence of the initial platinum atoms participates in activating hydrogen reduction in otherwise less active metal species. Full reduction of 90% platinum/10% rhodium was found to occur in about 48 hours at a temperature of 65° C.

Figure 3:
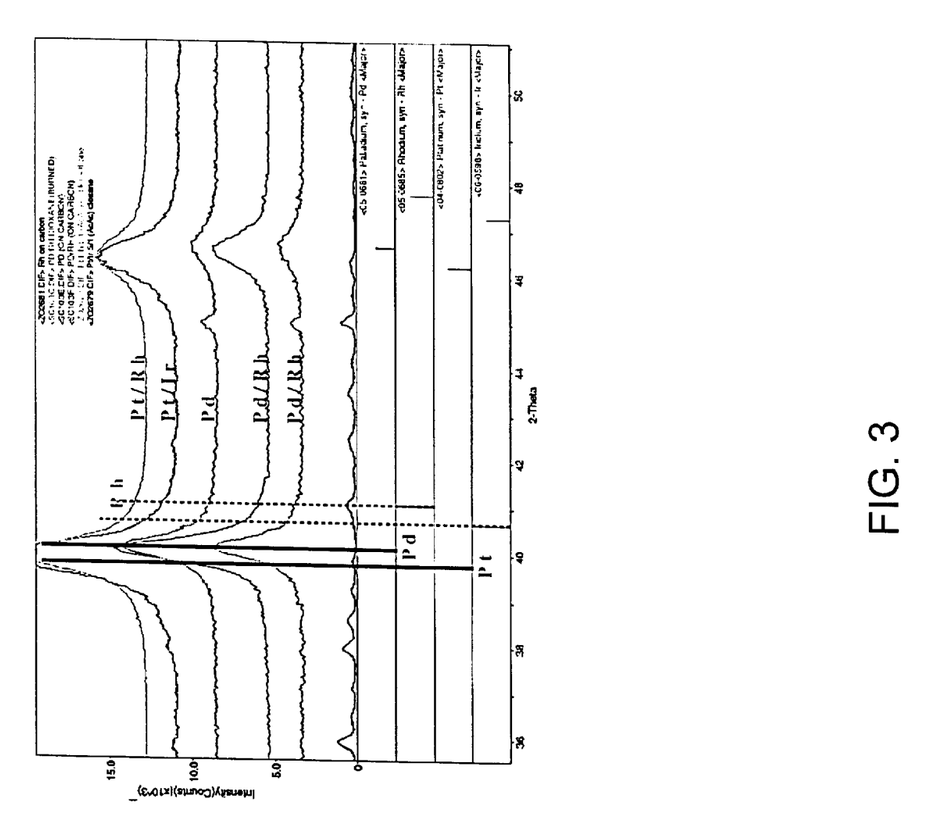
FIG. 3 shows an x-ray diffraction patterns of various noble metal alloys produced by the instant process.
Figure 5:
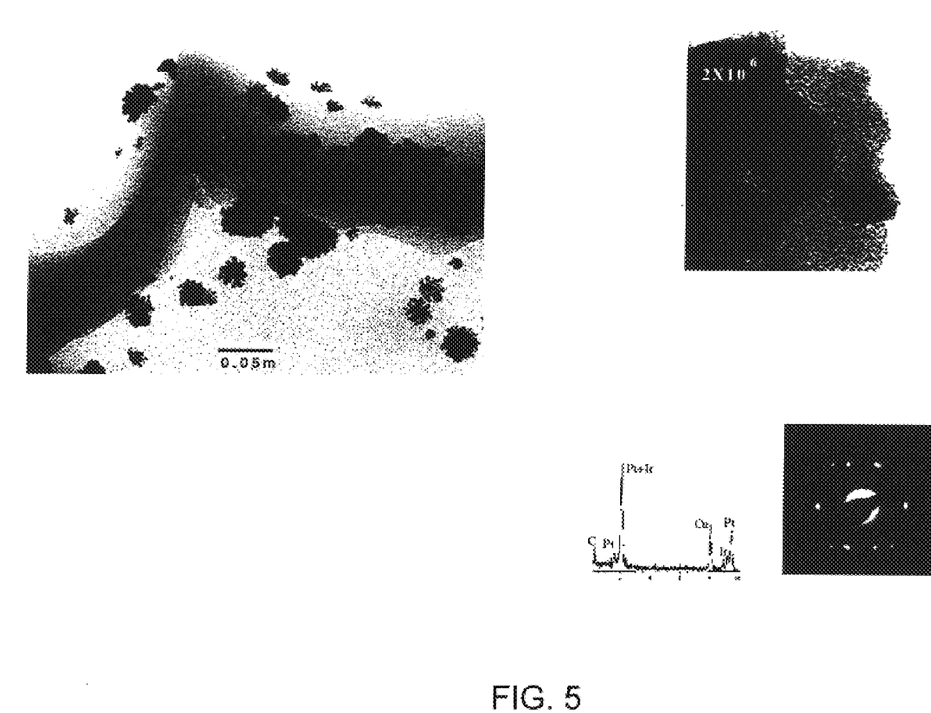
FIG. 5 shows a transmission electron photomicrograph of platinum/iridium formation directly on methacrylonitrile/divinylbenzene derived carbons. Energy dispersive x-ray analysis and electron diffraction confirms the alloy existence.

X-ray inspection was performed on powders prepared by the foregoing description in order to verify that an alloy had been produced. FIG. 3 illustrates diffraction patterns obtained for alloy powders of Pt/Rh, Pt/Ir, and Pd/Rh as prepared by this method. In addition, FIG. 5 illustrates a transmission electron photomicrograph of an Pt/Ir alloy on carbon and an accompanying EDAX x-ray spectrum of a representative particle.

The present embodiment will be described more fully hereinafter by way of an example illustrative of the invention. This invention, however, may be embodied in many different forms and should not be construed as limited to the embodiment set forth herein.

EXAMPLE

Separate 0.1 Molar solutions of platinum acetylacetonate and rhodium acetoacetonate were prepared in 1,2, dichloroethane (shown in FIG. 6). Each solution was prepared at essentially room temperature in clean, dry, glass vessels and stirred until the solute appeared to have completely dissolved. Higher concentrations are possible but at moderate or low concentrations no heat is required to facilitate dissolution. These solutions were then mixed together in a molar ratio of 9:1 and stirred vigorously. This mixed solution was then introduced, drop-wise, into about one liter of liquid nitrogen (LN), held in a standard, open mouth, vacuum Dewar flask. The resultant slurry of frozen beads was allowed to settle and the majority of LN decanted. The balance of the LN allowed to evaporate and the frozen beads of solution and solid precipitate were collected onto chilled trays and transferred into a vacuum sublimation chamber or "freeze-dryer".

The freeze-dry chamber was evacuated to less than about 200 mTorr while simultaneously chilling its contents, shelves, and other internal furniture to a temperature of about 15° C. below the melting point of the particular solvent used, about −50° C. for 1,2 dichloroethane. The frozen solution remained in the freeze-dryer under these conditions for about 24 hours after which the temperature of the chamber was increased to the solvent melting point, about −35° C. for 1,2 dichloroethane, while continuing to maintain a vacuum pressure of <200 mTorr. These conditions were again maintained for about another 24 hours after which the chamber temperature was raised again, to 10–15° C. above the solvent melting point. Again the conditions are maintained for another 24 hours at which point the vacuum pump is valved off and the chamber pressure monitored. If no substantial pressure rise was observed the sample is considered "dry" and the sample is returned to room temperature and the system vented to 1 atmosphere.

The resultant powder is then exposed to flowing hydrogen gas or hydrogen and an inert carrier gas such as argon-5% hydrogen. The resultant product consists of the fine crystal rosettes as seen in FIG. 6.

SECOND EMBODIMENT

A second embodiment comprising a catalyst is described hereinbelow. As, before a solution comprising preparing solutions of metal-containing organic compounds in a suitably common solvent is disclosed. These solution are again brought together and mixed thoroughly.

Again, solutions of compounds of this type appears to produce a solvation "complex" between the two separate species which upon rapid cooling leads to the formation of a single complex aggregate comprising both metal atoms. Catalysts may be formed by direct preparation of the metal-containing organic complexes onto a specific substrate or support by adding the substrate as a powder to the solution and creating a suspension of the substrate into the solution. The suspension is maintained by suitable and generally continuous mixing.

Figure 2A:
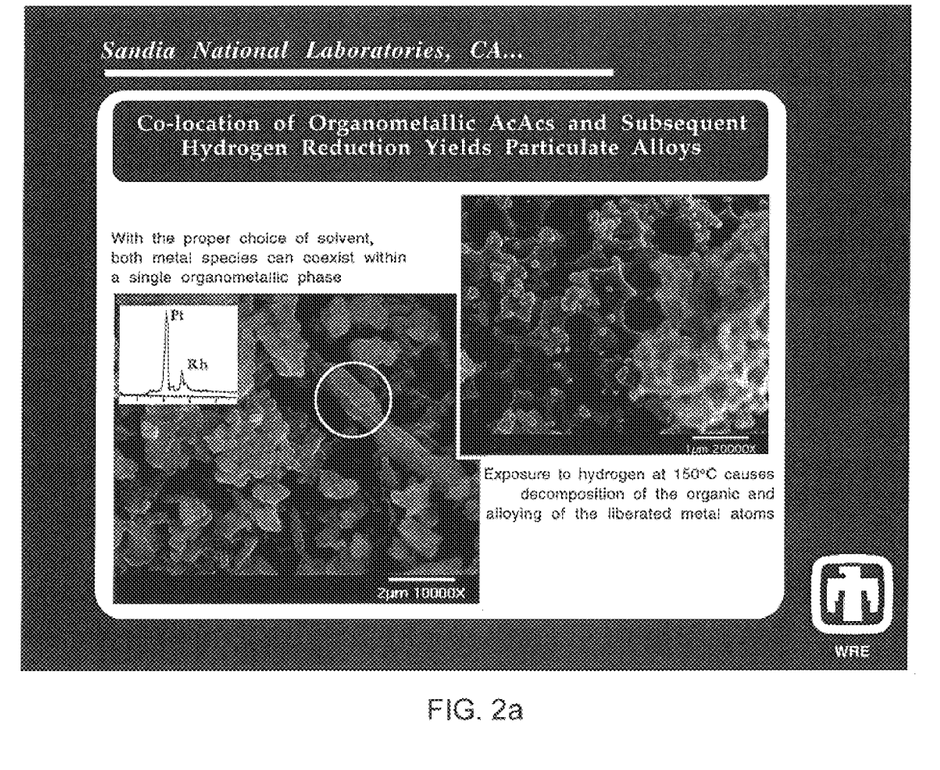
FIG. 2a shows a photomicrograph of particles of platinum/rhodium co-crystallized from a solvent solution comprising 1,2 dichloroethane, and then reduced to the metal. The crystals are precipitated onto a carbon substrate.
Figure 2B:
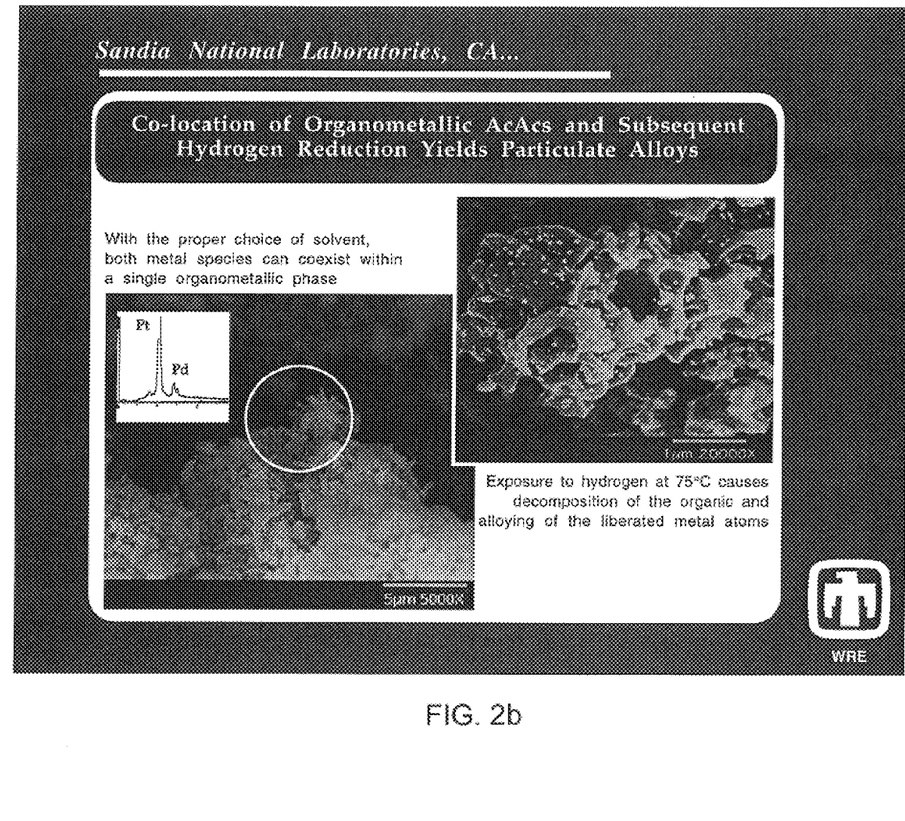
FIG. 2b shows a photomicrograph of particles of platinum/palladium co-crystallized from a solvent solution comprising 1,2 dichloroethane, and then reduced to the metal. The crystals are precipitated onto a carbon substrate.
Figure 2C:
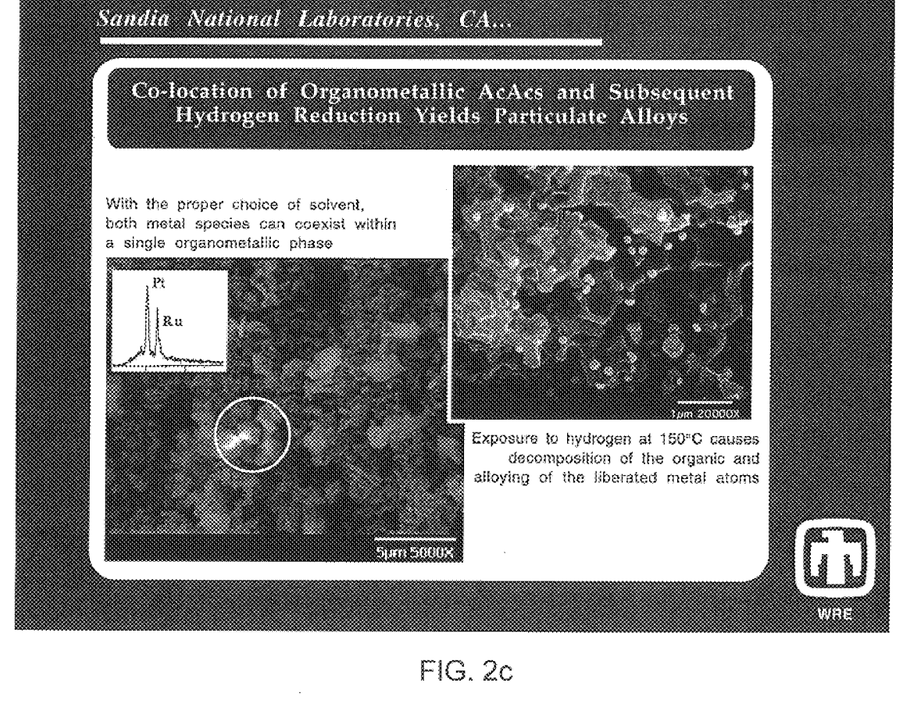
FIG. 2c shows a photomicrograph of particles of platinum/ruthenium co-crystallized from a solvent solution comprising 1,2 dichloroethane, and then reduced to the metal. The crystals are precipitated onto a carbon substrate.
Figure 4:
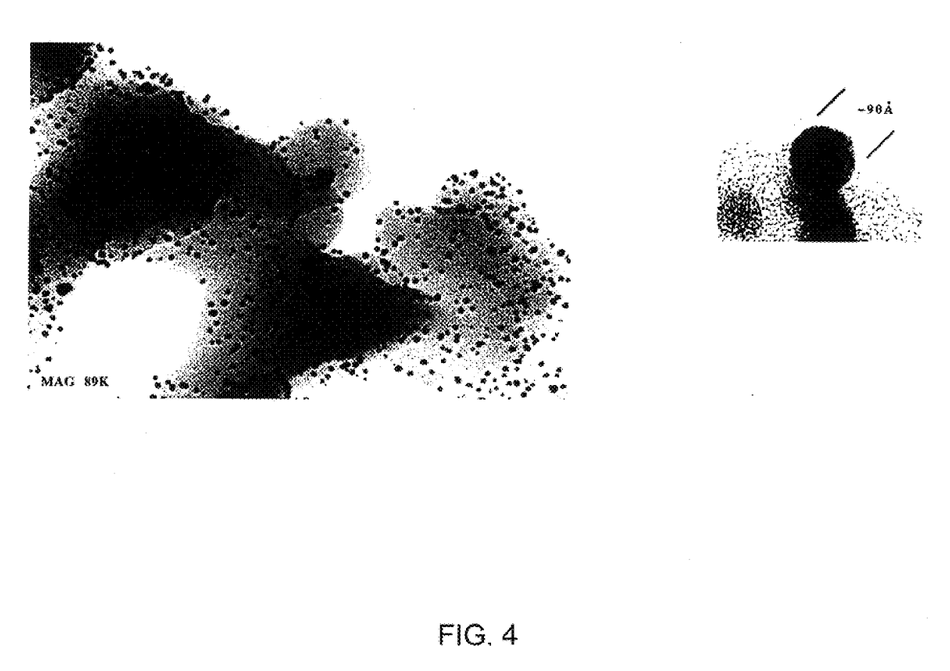
FIG. 4 shows transmission electron microscope ("TEM") photomicrographs of particles of platinum crystallites processed directly onto a polymeric carbon precursor and pyrolyzed to form the metal and carbon support in a single step.

The mixed solution, or solution/suspension, is now introduced into a cryogenic bath, as before, by either dripping small amounts of the solution into the cryogen in order to quickly freeze each droplet or using a fine jet of the solution which is injected at such a velocity that it penetrates the cryogen surface and is dispersed within the bulk of the cryogen bath. This rapid freezing initiates an equally rapid solute/solvent phase separation which quenches the postulated metal-containing organic complex formed into very small co-crystalline clusters onto the catalyst support substrate. After freezing, the droplets are collected and freeze-dried to remove the surrounding frozen solvent. The final metal catalyst is formed by the same low temperature reduction technique employed in the first embodiment. FIGS. 2a, b, and c. show various noble metal alloys precipitated onto a carbon substrate by the instant process. FIGS. 4 and 5 show transmission electron microscope photomicrographs of noble metal alloy particles supported on carbon as the added substrate material.

What is claimed is:

1. A low temperature method for preparing a metal alloy catalyst, the method comprising the steps of:

(a) dissolving a first metal-containing organic compound into a first quantity of a solvent medium capable of solvating the organic compound to provide a first dilute solution, said first metal-containing organic compound comprising an organic ligand and one or more of a first noble transition metal ion;

(b) dissolving a second metal-containing organic compound into a second quantity of the solvent medium to provide a second dilute solution, said second metal-containing organic compound comprising the organic ligand and one or more of a second noble transition metal ion;

(c) mixing a first portion of said first dilute solution with a second portion of said second dilute solution to provide a mixed solution, said first and second portions chosen to provide a desired ratio of said first and second noble transition metal ions;

(d) adding and uniformly dispersing an inert catalyst support material throughout said mixed solution to provide a solution suspension, (e) dispersing said solution suspension into a plurality of droplets and depositing said droplets into a cryogenic liquid so as to quickly freeze said droplets and thereby initiate a precipitation of said first and second metal-containing organic compounds onto said inert catalyst support material;

(f) removing said cryogenic liquid by decanting and evaporating said liquid, said droplets maintained at a temperature below said solvent medium melting point;

(g) removing the solvent medium from said frozen droplets by sublimation or evaporation, said step of removing providing a plurality of dispersed crystallites deposited on said inert catalyst support material; and (h) flowing a reducing gas over said dispersed crystallites at an ambient pressure of about 1 atmosphere while heating said dispersed crystallites and said inert catalyst support material to a ambient temperature of below about 150° C. thereby reducing said dispersed crystallites to provide a plurality of finely-divided noble transition metal alloy particles on said inert catalyst support material, said metal alloy particles and said inert catalyst support material comprising said metal alloy catalyst.

2. The method of claim 1, wherein said first and second dilute solutions have a solute concentration of about between 0.01M to 0.2M.

3. The method of claim 1, wherein the cryogenic liquid comprises liquid nitrogen, liquid argon or liquid helium.

4. The method of claim 1, wherein said noble transition metal ions are ions of metals selected from the group consisting of platinum, palladium, rhodium, ruthenium, iridium, and rhenium.

5. The method of claim 1, wherein the organic ligand is an acetylacetonate-based molecule.

6. The method of claim 1, wherein the reducing gas is hydrogen or a mixture of hydrogen and argon.

7. The method of claim 1, wherein the organic ligand is a cyclooctadiene-based or an acetate-based molecule.

* * * * *